Nov. 9, 1965        A. A. STRICKER ETAL        3,216,097
                    CONTACT PIN INSERTER
Filed April 16, 1963                          9 Sheets-Sheet 6

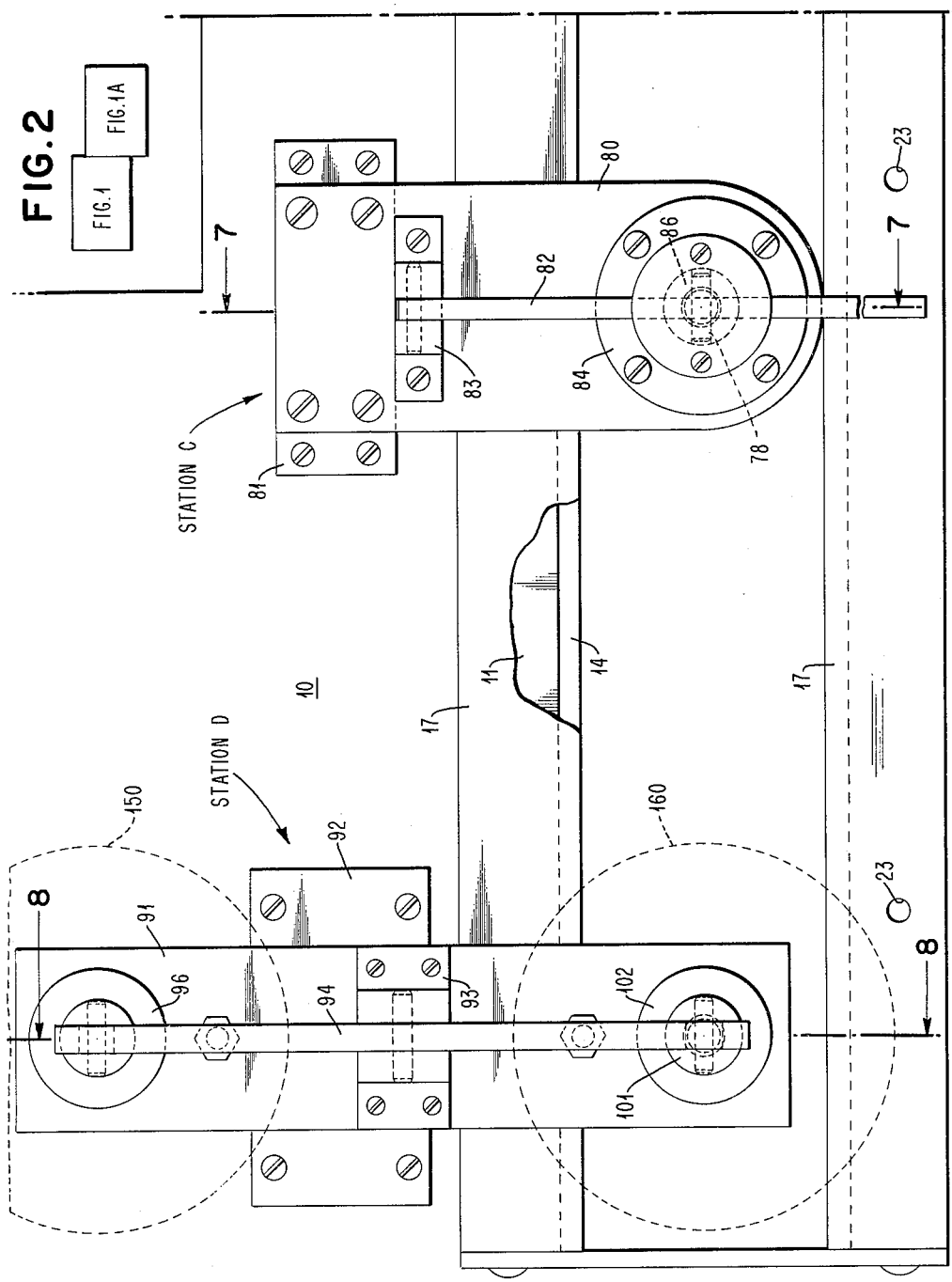

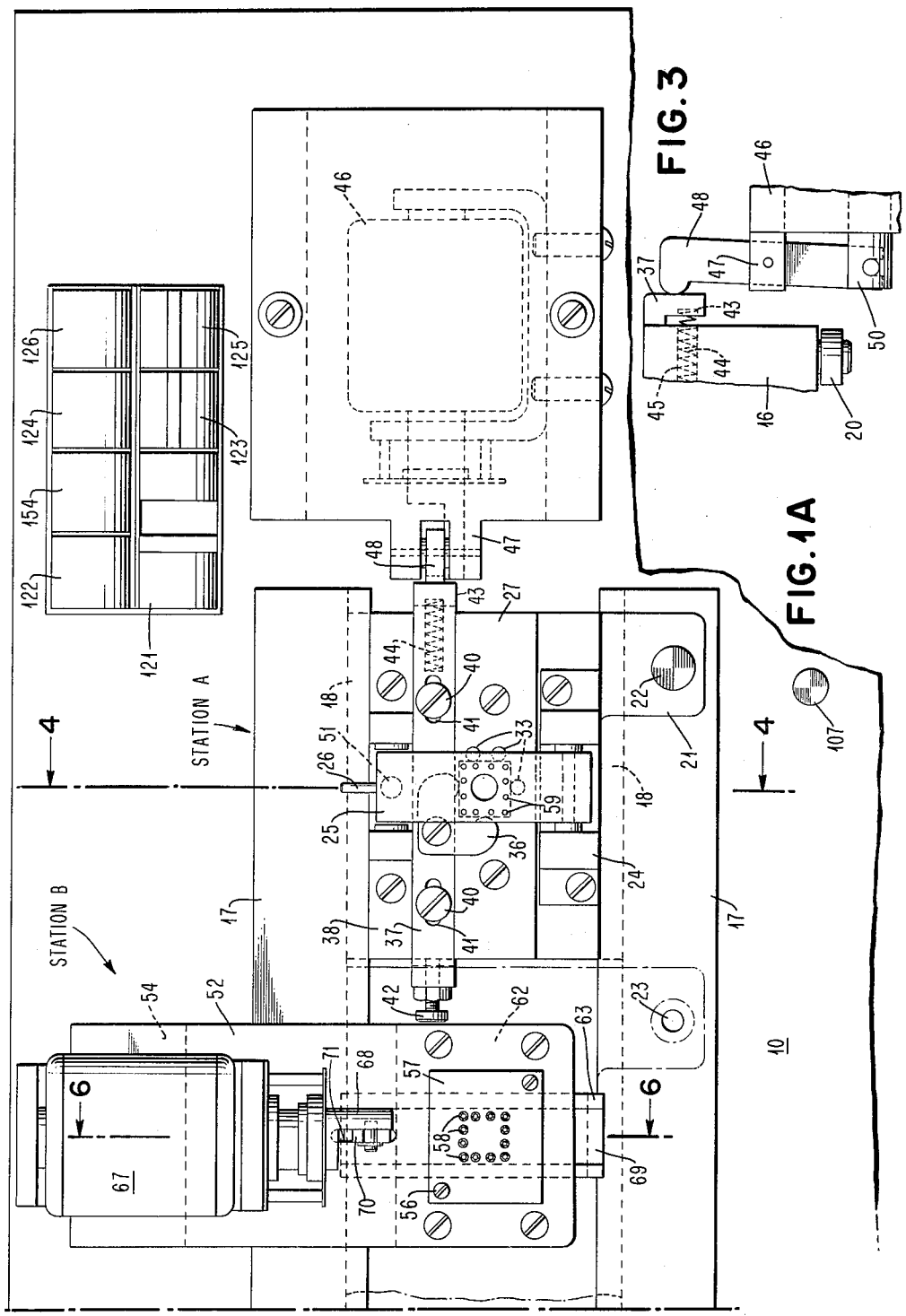

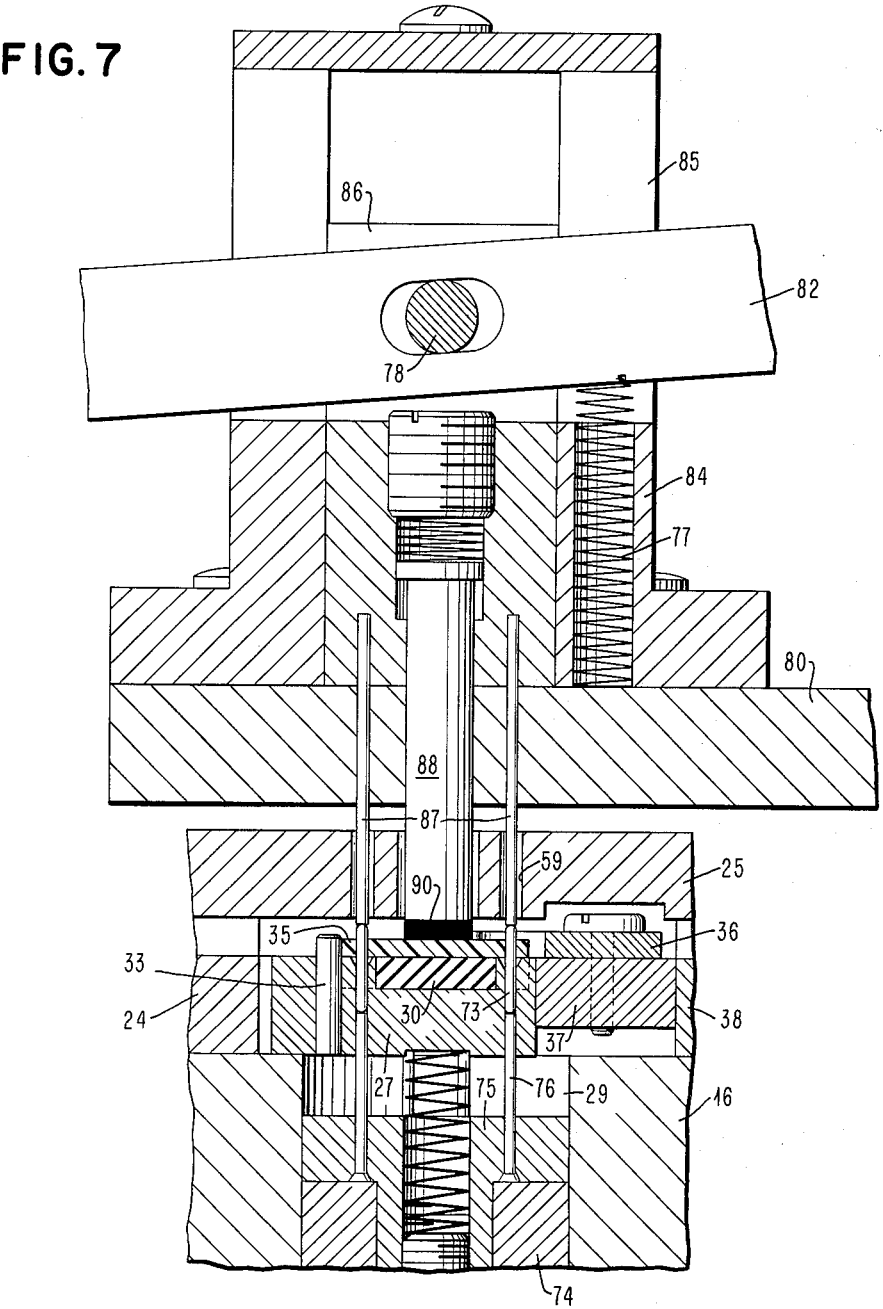

Nov. 9, 1965  A. A. STRICKER ETAL  3,216,097
CONTACT PIN INSERTER
Filed April 16, 1963  9 Sheets-Sheet 8
FIG.16
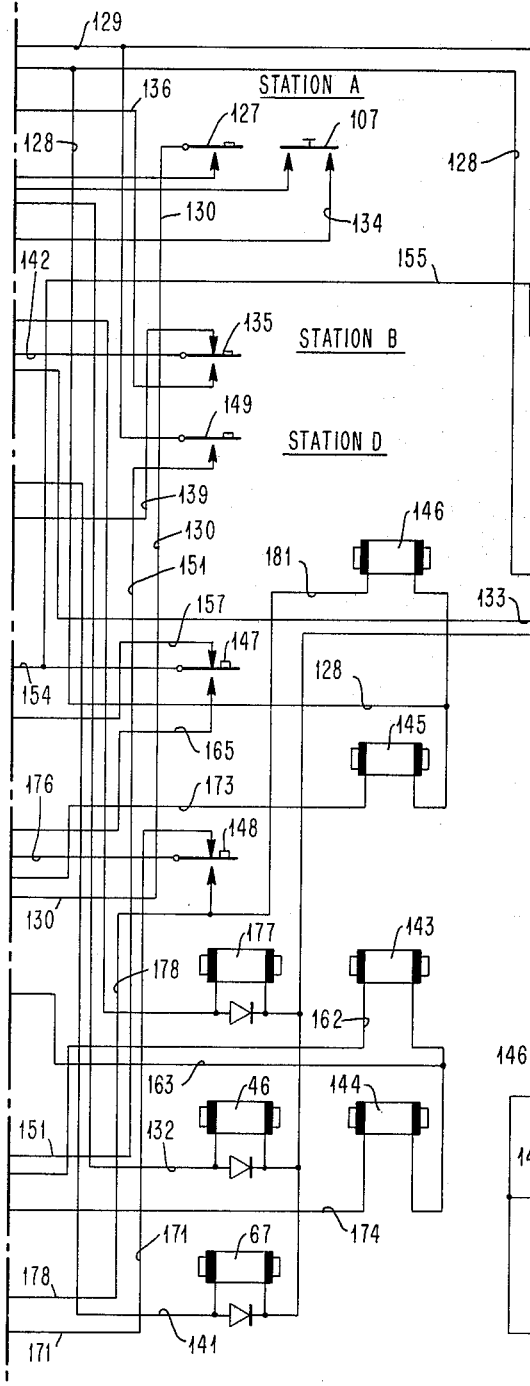
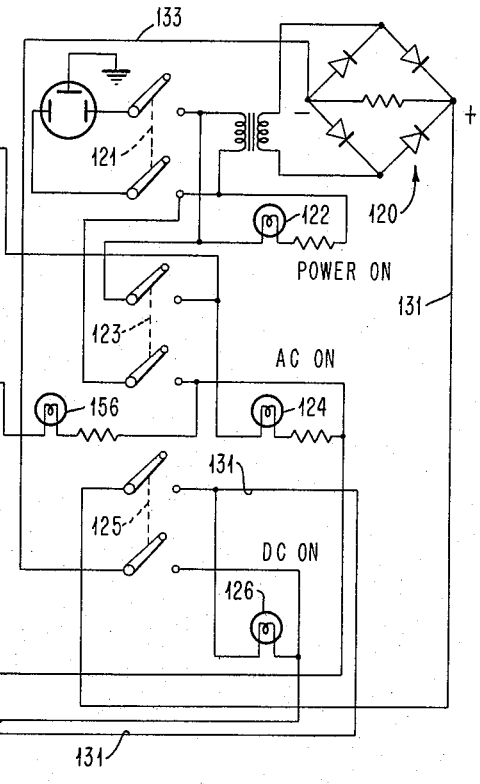
FIG.14
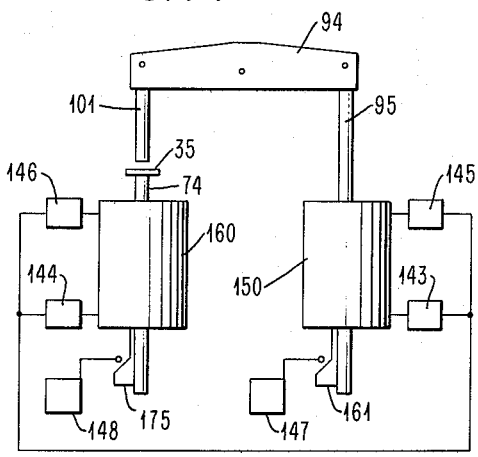

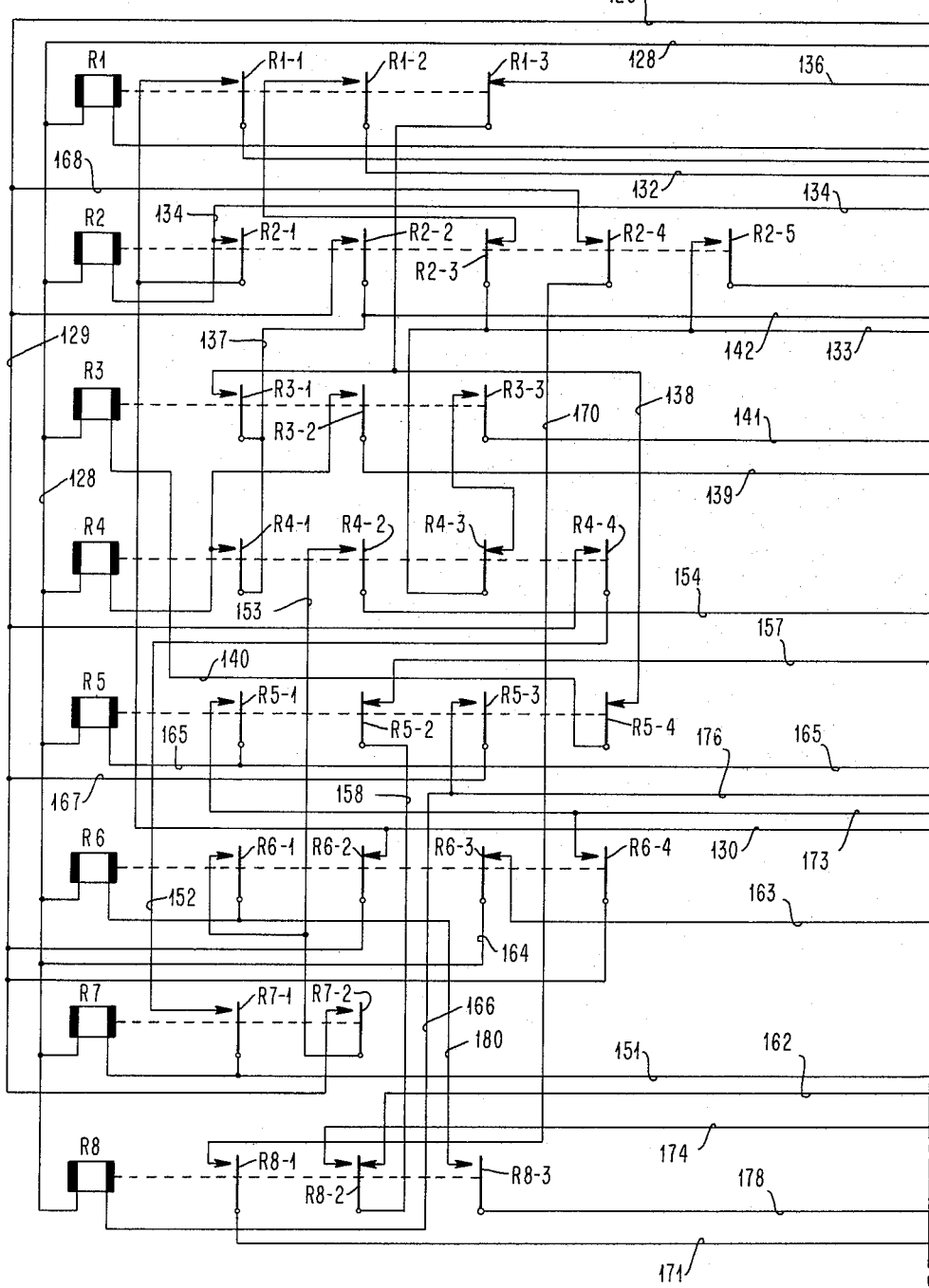

United States Patent Office 3,216,097
Patented Nov. 9, 1965

3,216,097
CONTACT PIN INSERTER
Alfred A. Stricker, Kingston, and Sol Kamenetsky, Wappingers Falls, N.Y., assignors to International Business Machines Corporation, New York, N.Y., a corporation of New York
Filed Apr. 16, 1963, Ser. No. 273,353
5 Claims. (Cl. 29—203)

This invention relates to assembly machines and more particularly to a machine for inserting contact pins in a substrate.

Many circuits are being miniaturized by adding thin film components to ceramic substrates. In order to provide connections for these circuits, some form of contact must be provided. Pins have been found to be the most practical. These pins, in most instances, however, are very small and extremely hard to anchor securely in the substrate.

It is therefore the principal object of this invention to provide a machine that will insert and secure a plurality of contact pins simultaneously in a substrate.

Another object is to provide a method of feeding, inserting and securing a contact in a ceramic substrate.

A further object is to provide a device that will fasten a contact pin in a ceramic substrate without damaging the substrate.

The foregoing and other objects, features and advantages of the invention will be apparent from the following more particular description of the preferred embodiment of the invention, as illustrated in the accompanying drawings.

In the drawings:

FIGS. 1 and 1A when combined in accordance with FIG. 2 form a plan view of the invention.

FIG. 3 is a detail of the clamp operating mechanism.

FIG. 7 is an enlarged cross section taken along line 7—7 of FIG. 1.

FIG. 14 is a schematic of the air cylinders used at the forming station showing the electrical and air cylinder controls.

FIGS. 15 and 16 combined as shown in FIG. 17 form a schematic of the operating circuit of the invention.

The machine comprises a track along which a carriage or table carrying the substrate is positioned sequentially at four stations. At the first station the substrate is manually positioned and locked on the table. At the next station the pin contacts are fed from a vibrating bowl and located in the substrate. At the third station the pins are pushed through the substrate into contact with plungers in a ram in the carriage. The fourth station comprises a ram that swages a head on the pins and the ram in the table raises the substrate and pins to a point in the die where the first ram by a second operation swages a bulge on the pins below the substrate.

Figure 4:
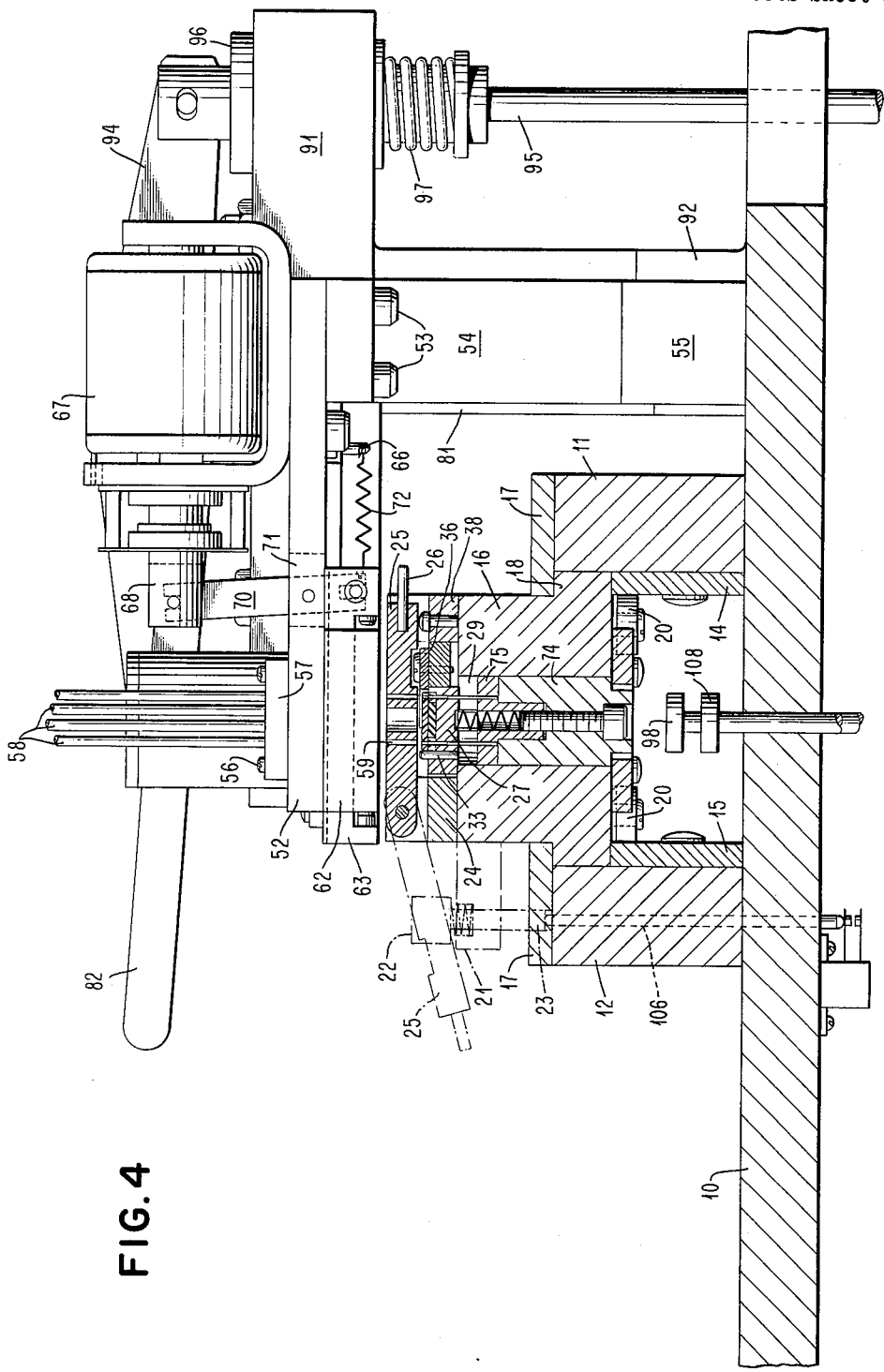
FIG. 4 is a cross section taken along line 4—4 of FIG. 1A showing the arrangement of parts in side elevation.

Referring to FIGS. 1 and 1A combined and FIG. 4 we see a base 10 on which is mounted a pair of bars 11 and 12 extending the length of the base on the inner surface of which is secured a pair of rails 14 and 15 on which a rectangular block or table 16 slides. Two cover strips 17 are secured to the bars 11 and 12 and engage shoulders 18 formed on the block 16. Four rollers 20 secured to the bottom face of the block and bearing on the inner face of rails 14 and 15 guide the table and prevent binding. An ear 21 formed on table 16 and having a spring pressed pin 22 therein provides a means for sliding the table along the rails. Holes such as 23 provided at each point of the process are adapted to be engaged by pin 22 and thus locate the table with respect to the different stations A, B, C and D. Each of the locating holes, except that at station C, has a pin therein that actuates a microswitch as will be described. Secured to the top of block 16 is a trunnion block 24 in which is mounted a guide member 25 for the pins which is provided with a handle 26 by which it can be swung to the dotted line position of FIG. 4. In this position a die plate 27 (FIG. 5) is exposed in which is formed a nest 28 for a resilient block 30 of rubber or other suitable material. In forming the nest the plate 27 is serrated to leave stock for holes 31 that act as further guides for the contact pins. The plate 27 is secured over a cylindrical aperture 29 formed in the center of the table 16. A plunger 74 reciprocating in this aperture will be described later.

Figure 5:
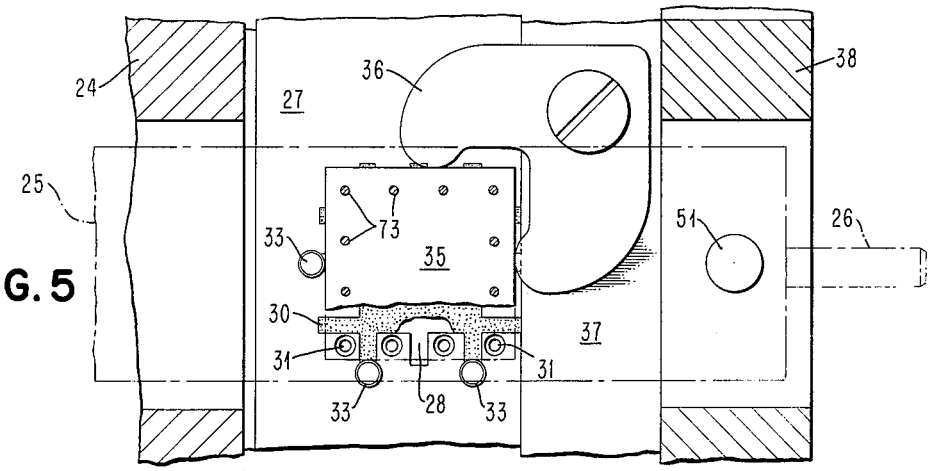
FIG. 5 is an enlarged view of the carrier for the substrate.

Adjacent the nest 28 are three pins 33 for locating the holes 34 in the substrate 35 in alignment with the holes 31. An L shaped clamping member 36 is freely pivoted on a slide 37 in a groove between plate 27 and a bar 38. The slide is secured to table 16 by screws 40 acting in slots 41. One end of slide 37 is provided with a limit screw 42 that abuts the side of the table to prevent damage to rubber pad 30 when no substrate is located between pins 33 and clamp 36. A shoulder 43 (FIG. 3) at the other end of slide 37 acts against a spring 44 located in a channel 45 in the table 16 to hold the slide to the right. A solenoid 46 secured to the base 10 to the right of station A has a bracket 47 (FIG. 3) secured to its frame on which is pivotally mounted an arm 48 having a rounded nose adapted to engage the shoulder 43 when the table is at station A. Pivotally secured to the bottom of arm 48 is the plunger 50 of the solenoid which when operated will rock arm 48 moving slide 37 to the left freeing any substrate positioned on the table and permitting a new substrate to be placed on the cushion 30 and against pins 33. When the solenoid is released the slide will move to the right (FIG. 1A) bringing first one arm and then the other of clamp 36 in engagement with the substrate until is it firmly held between the clamp and pins using only that force provided by the spring 44. After the substrate or wafer is positioned as seen in FIG. 5 the guide block 25 is swung over substrate but kept from contact therewith by pin 51. The pin 22 is now withdrawn from the hole 23 at station A and the table is moved to the left until the pin can drop into the positioning hole at station B as shown in dot and dash lines (FIG. 1A).

Figure 6:
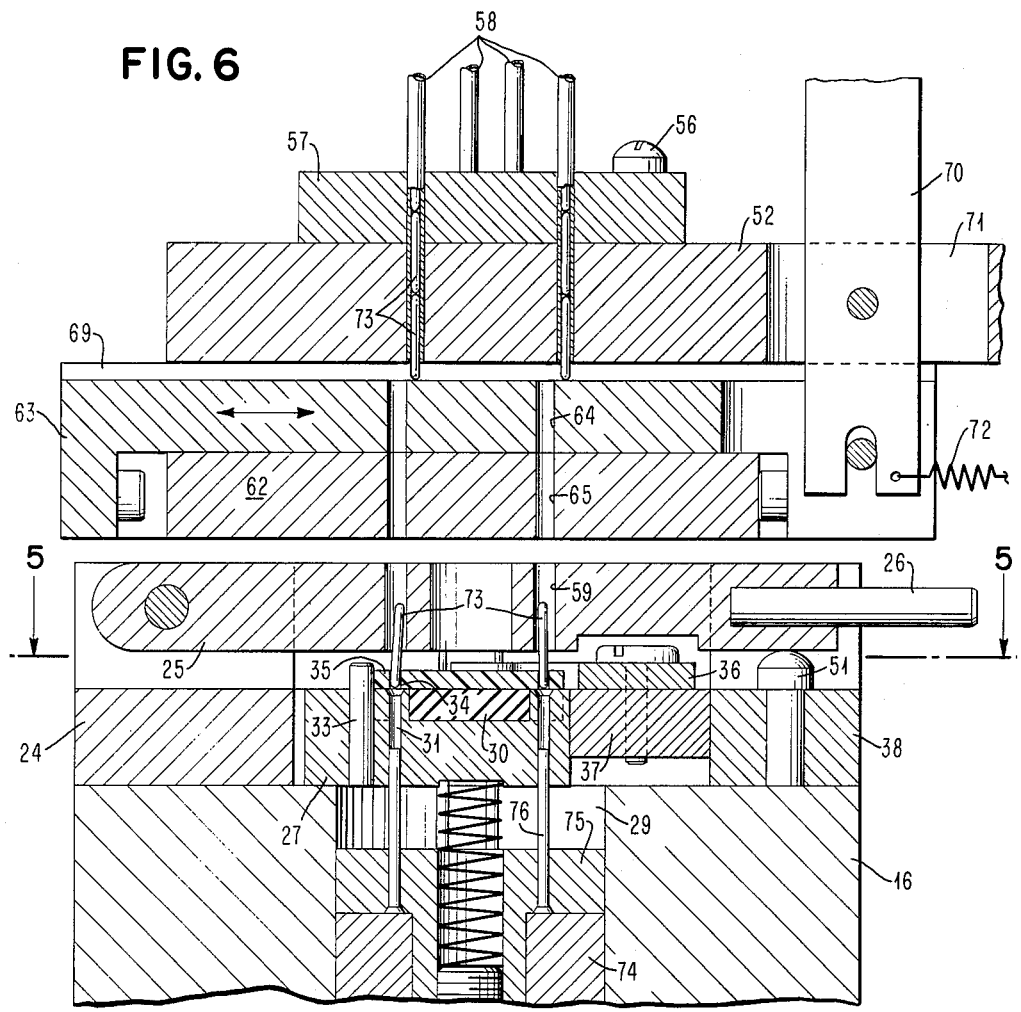
FIG. 6 is an enlarged cross section taken along line 6—6 of FIG. 1A showing the mechanism for feeding the pins.

Station B, as shown in FIGS. 1A, 4 and 6, comprises a platform 52 secured by screws 53 to a T shaped post 54 having feet 55 that are welded to the base 10. Secured by screws 56 to the platform is a terminal block 57. The ends of tubes 58 leading from any form of feed (not shown) such as a vibrating bowl, shuttle, etc. are force fit in terminal block 57 and platform 52. The tubes and holes are arranged in a pattern similar to that in guide 25 but not in alignment therewith.

On the underside and to the front of platform 52 is secured a slotted plate 62. Slidably mounted in this plate is a shuttle 63 containing holes 64 that correspond and align with holes 65 in plate 62. These holes are in alignment with holes 59 in the guide 25.

Secured to the platform 52 is a solenoid 67 having a plunger 68 connected to the top of a lever 70 that is pivoted in a slot 71 in the platform. The lower end of the lever is connected to the shuttle 63 by a pin and slot connection. A spring 72 fastened to the bottom of lever 70 and extending to a pin 66 on the platform holds the shuttle in the position of FIG. 4. In this position the holes 64 are not in register with holes 65 in the plate 62. This will permit a contact pin 73 that has been fed down each of the tubes 58 in terminal block 57 to drop down into holes 64 and come to rest on the upper surface of block 62. The head of each pin in this position will extend into a slot 69 cut in shuttle 63. When the solenoid 67 is operated and the shuttle moved to the position of FIG. 6, the pins 73 in the shuttle will drop through holes 65 and come to rest partially in holes 59 and in the holes 34 in the ceramic substrate. Meanwhile, the pins in the tubes 58 and platform 52 have dropped down onto the surface of shuttle 63 as seen in FIG. 6.

Any discrepancy in the location of the holes 34 in the substrate 35 is overcome by forming the holes 59 in the guide slightly oversize. This allows the pins 73 a small amount of freedom in seeking entrance to the holes 34.

Mounted for reciprocation in block 16 by any well known means such as an air cylinder under the base (not shown) is a ram 74 having a head 75 secured thereon in which is secured rods 76 equal in number and pattern to the holes in substrate 35. The rods extend upward into the die plate 27. The holes or dies 31 which equal in number and pattern the holes 34 of the substrate are countersunk at the top as a guide for the pins 73.

The table 16 is now moved to station C (FIGS. 1 and 7) and located by pin 22 as above. Station C comprises a platform 80 secured to a column 81 similar to the column 54. The end of a lever 82 is pivoted in a trunnion block 83 secured to the top of the platform. Secured to the top of the platform is a cylindrical member 84 that is slotted at 85 to accommodate the center of lever 82. Reciprocably mounted in the cylinder is a ram 86 to which the lever is connected by a pin and slot 78 connection. Secured in plunger 86 and extending through the platform 80 are rods 87 similar to rods 76. Also mounted in member 84 and spring biased downward is a cylindrical finger 88 that is tipped with a rubber cushion 90.

When the lever 82 is rocked downward against the action of spring 77 by the operator to the position of FIG. 7 the rods 87 will force pins 73 down onto rods 76 and the finger 88 will resiliently press the substrate 35 down onto the pad 30 holding it firmly to prevent fracture during the inserting of the contact pins.

Figure 8:
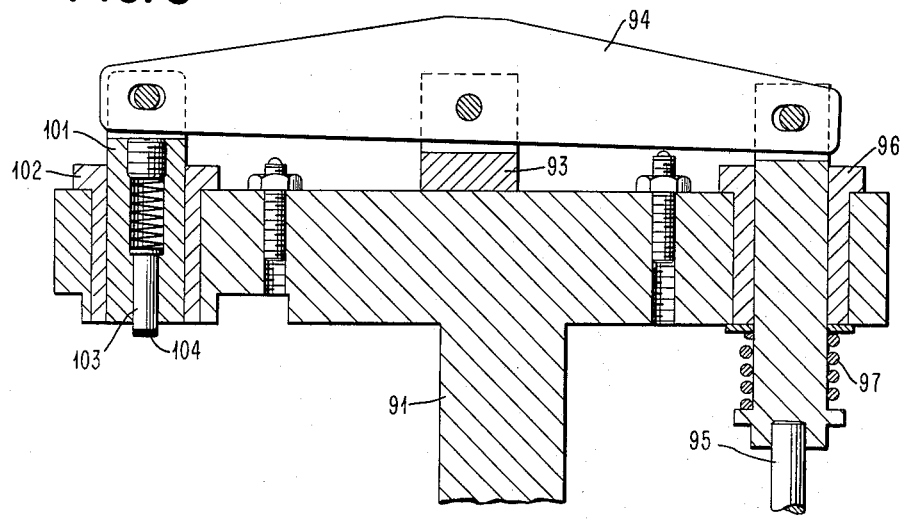
FIG. 8 is a cross section taken along line 8—8 of FIG. 1.

After the pins are seated, the table 16 is moved to station D which comprises a "T" shaped platform 91 (FIG. 1 and 8) having feet 92 that are secured to the base. A trunnion block 93 secured to the center of the platform carries a walking beam 94. One end of the beam is connected by a pin and slot connection to a piston rod 95 mounted in a sleeve 96. The rod 95 is biased downward by a spring 97 and is operated by an electrically controlled air cylinder 150 mounted under the base. The rod when actuated will drive the walking beam counterclockwise (FIG. 8).

The front end of beam 94 is connected by a pin and slot connection to a ram or plunger 101 acting in a sleeve 102. Slidably mounted in the plunger is a finger 103 that is spring biased downward. A cushion 104 of rubber or other resilient material is bonded to the end of the finger.

Figure 9:
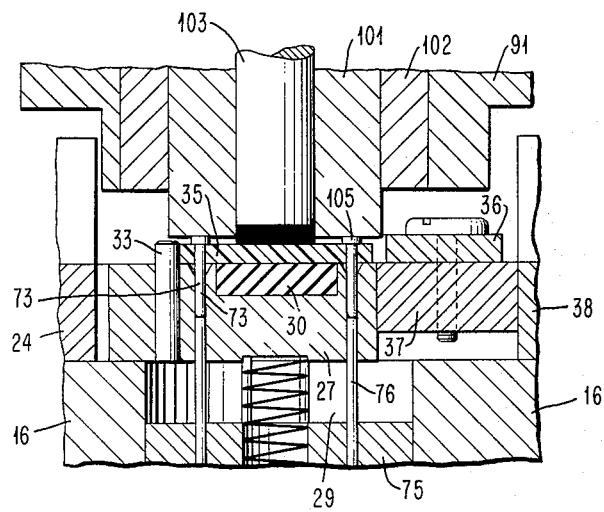
FIG. 9 is a combined cross section of a portion of the carriage as taken along line 4—4 of FIG. 1A and a portion of the punch taken along line 8—8 of FIG. 1 showing the punch forming heads on the pins.
Figure 10:
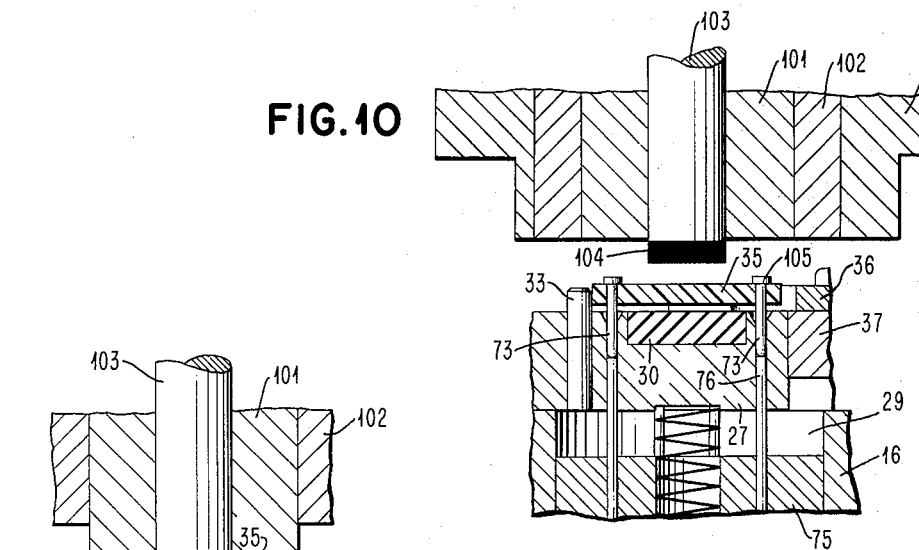
FIG. 10 is similar to FIG. 9 and shows the substrate raised prior to bulging.
Figure 11:
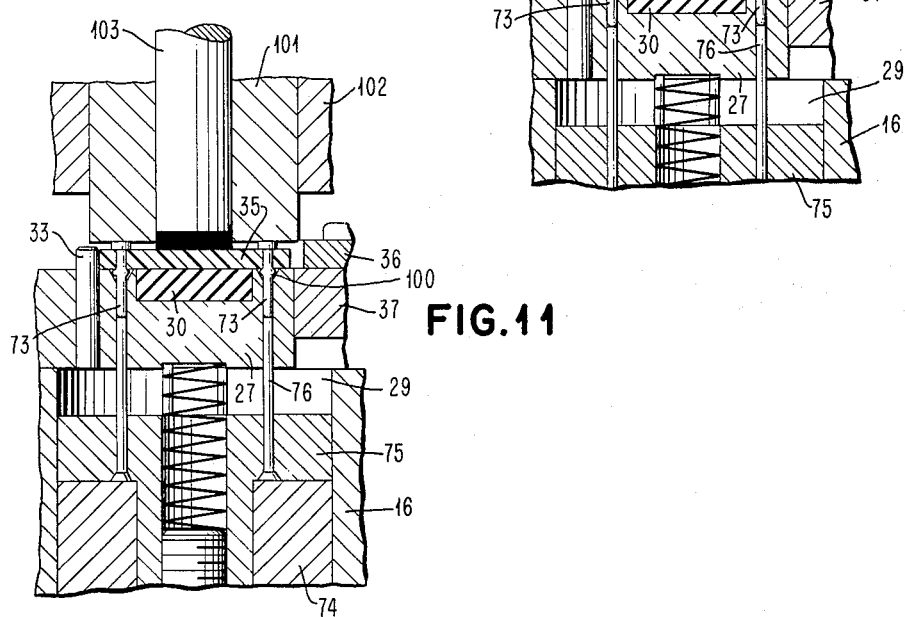
FIG. 11 is similar to FIG. 9 and shows the position of parts during bulging or staking of the pin.

With the contact pins 73 positioned as shown in FIG. 7, if the air cylinder is operated, the plunger 101 will descend (FIG. 9) and act as a hammer to form a head 105 on each of the pins. As was the case at station C the rubber block and finger will exert a firm but resilient hold on the substrate. When the air cylinder is reversed the spring 97 will assist in rocking the beam clockwise raising the plunger 101. At this time any well known device such as an air cylinder 160 will raise piston rod 98 (FIG. 4) in turn raising ram 74 with rods 76 that will raise the substrate and pins to the position of FIG. 10 where it will be held while the air cylinder 150 is again operated rocking the beam counterclockwise to move the plunger 101 to the position of FIG. 11. During this movement the metal of the pins flows into the countersunk portion of the die 27 to form the bulge 100 below the substrate. This action not only forms the bulge but forces the bulge into the substrate. Here again the wafer is held firmly by finger 103.

After the pins are firmly anchored in the substrate the table is returned to station A. It may be well here to point out that in each of the positioning holes 23 at stations A, B and D, there is a pin such as 106 (FIG. 4) that extends through the base 10. When the pin 22 is depressed at each of the above stations the pin 106 will operate a microswitch that will control a circuit to be described later.

Figure 12:
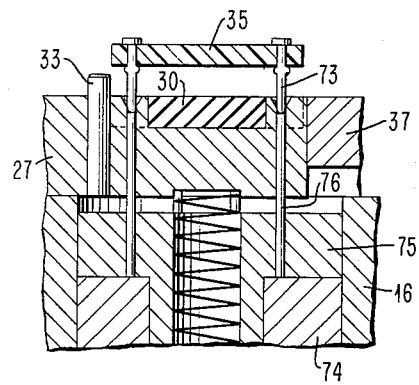
FIG. 12 is similar to FIG. 6 showing the finished substrate being expelled from the die.
Figure 13:
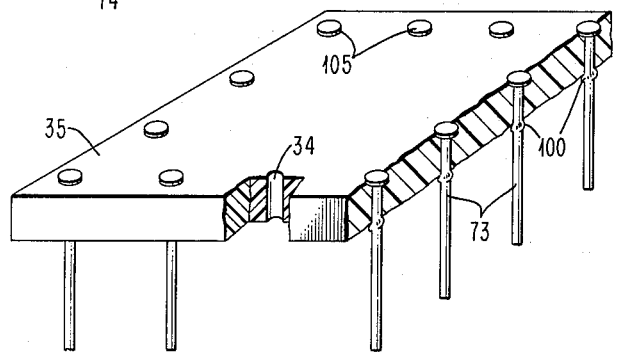
FIG. 13 is an isometric view of a finished substrate partly in cross section.

At station A there is also a button 107 which will close a circuit for a solenoid (shown on schematic) the plunger 108 of which extends upward through base 10. The depression of pin 22 will close a circuit to the solenoid 46 which will release clamp 36 and the plunger 108 will raise the ram 74 and the rods 76. The rods will act against the pins 73 raising the substrate to the position of FIG. 12 where it can be removed by the operator.

Since solenoids and microswitches are well known, the machine drawings have been simplified by omitting the showing of all of these devices located below the base with the exception of the microswitch under the locating hole 23 at sation A All of the electrical devices are shown in the circuit schematic. The air cylinders 150 and 160 (FIG. 14) are double-acting double-ended and have electromagnetically operated valves 143, 144, 145 and 146 that admit air above or below a piston to drive positively up or down. Microswitches 147 and 148 controlled by cams on the ends of pistons of the air cylinders actuate circuits for sequentially controlling the different operations.

Operation

The operation of the device will be detailed by a description of the operating circuit. In the following description normally closed contacts will be designated NC, i.e., NC contact 2 and closed or transferred contacts will be designated T, i.e., T contact 2. A.C. and D.C. current are provided, one direct and the other through rectifier 120. The switch 121 connects A.C. to the rectifier circuit and lights Power On lamp 122. Switch 123 connects A.C. to the relay circuits and air cylinder valves over leads 128 and 129 and lights A.C. On Lamp 124, switch 125 connects D.C. to the circuits for solenoids 46, 67 and 177 and lights D.C. On lamp 126.

With the table at station A and the pin 22 depressed, the microswitch 127 closed, a circuit is completed from A.C. lead 128 (FIG. 15), through relay R1, switch 127, lead 130, NC contact R6–2 to A.C. lead 129, operating relay R1. Operation of relay R1 closes a contact R1-2 completing a circuit from positive D.C. on lead 131 (FIG. 16), through solenoid 46, lead 132, T contact R1–2, NC contact R2–3 to negative D.C. on lead 133. Operation of solenoid 46 opens the clamp 36 permitting the operator to seat a substrate 35 on the carriage. Relay R1 also prepares a circuit for relay R2 extending from A.C. lead 128, through the relay R2, lead 134, switch 107 which is now operated, T contact R1–1 and NC contact R6–2, to lead 129, operating relay R–2. Relay R–1 also at its contact R1–3 opened a possible circuit for relay R–3 preventing its operation until the carriage leaves station A. Relay R–2 locks up over a circuit from A.C. lead 128, winding of the relay, T contact R2–1, and NC contact R6–2 to A.C. lead 129. T contact R2–2 connects lead 129 to the center leg of switch 135 at station B. Relay R2 through the opening of NC contact R2–3 releases the solenoid 46 closing clamp 36 about the substrate.

The table is now moved to station B where the microswitch 135 when operated by pin 22 will then connect its center leg to lead 136, through NC contact R1–3 (relay R1 now being released by moving the table from station A which permitted microswitch 127 to open), lead 138, NC contact R5–4, through the winding of relay R3, to lead 128 operating the relay. Relay R3 locks up from lead 129, contact R2–2, lead 137, T contact R3–1, lead 138 and NC contact R5–4, lead 140 through the relay to lead 128. Contact R3–2 prepares a circuit for relay R–4 which will be closed when the carriage leaves station B and microswitch 135 returns to normal. Contact R3–3 completes a circuit from negative D.C., lead 133, NC contact R4–3, T contact R3–3, lead 141, winding of solenoid 67, to positive lead 131 to operate the solenoid and shift shuttle 63 to feed pins to the substrate.

The table is now moved to station C where the manual operation of lever 82 will force the contact pins 73 through the substrate. As the table leaves station B the center spring of microswitch 135 will open the operating circuit of relay R3. However, relay R3 remains operated through the NC contact R5–4, T contact R3–1 and T contact R2–2. The switch 135 now closes a circuit from lead 129, T contact R2–2, lead 142, through the switch, lead 139, T contact R3–2, winding of relay R4, to lead 128 operating the relay. Relay R4 locks up through T contact R4–1, lead 137, T contact R2–2. The operation of relay R4 opens NC contact R4–3 releasing solenoid 67 permitting slide 63 to return to normal. After setting the contact pins at station C, the table is moved at station D. At this point it may be well to recall that at this station air cylinders were used to head the pins and raise the substrate to permit the shank of the pins to be swaged below the substrate. Referring to FIG. 14, the two cylinders 150 and 160 are shown with their electromagnetic valves 143 and 144 for driving their pistons upward and 145 and 146 for driving them down. Microswitches 147 and 148 are controlled by cams on the downwardly extended plungers of the cylinders.

At station D, the switch 149 will be actuated closing the operating circuit for relay R7 over lead 151, and locks up over T contact R7–1, lead 152 and T contact R4–4. T contact R7–2 will complete a circuit from lead 129, through the contact, lead 153, T contact R4–2, over leads 154 and 155 to light the lamp 156 indicating Forming Not Complete which will remain lighted until the substrate is finished. A circuit is also closed through contacts R7–2, lead 153, R4–2, lead 154, NC contact of microswitch 147 on the plunger of the air cylinder 150, over lead 157, NC contact R5–2, lead 158, NC contact R8–2, lead 162, through air cylinder "Up" valve 143, lead 163, NC contact R6–3, lead 164 to lead 128. This opens the valve 143 and the piston rod 95 rises rocking walking beam 94 to force ram 101 down to form heads on the contact pins. As the plunger reaches the end of its stroke the cam 161 (FIG. 14) will open the normally closed contact of switch 147 and close the normally open contact. This will open the circuit just traced for the "Up" valve 143 and close the operating circuit for relay R5 that extends from lead 128, winding of relay R5 lead 165, T contact of microswitch 147, lead 154, T contact R4–2, lead 153, T contact R7–2 to lead 129. Normally closed contact R5–4 opens the holding circuit for relay R3 releasing that relay. Relay R–8 is operated over lead 167, through T contact R5–3, lead 166 and is locked up over a circuit from lead 128, over lead 168, T contact R2–4, lead 170, T contact R8–1, lead 171, NC contact of microswitch 148, over lead 176, through the winding of relay R8 to lead 128.

Down valve 145 for cylinder 150 is operated over a circuit from lead 128, winding of the valve, lead 173, T contact R5–1, lead 165, T contact of microswitch 147, lead 154, T contact R4–2, lead 153, T contact R7–2, to lead 129. This will draw piston rod 95 down and raise ram 101.

With the piston of cylinder 150 down the microswitch 147 is opened by cam 161 opening the holding circuit for relay R5. The release of relay R5 completes a circuit for the UP valve 144 from lead 129, T contact R7–2, lead 153, T contact R4–2, lead 154, normally closed contact of microswitch 147, lead 157, NC contact R5–2, lead 158, T contact R8–2, lead 174, through valve 144, lead 163, NC contact R6–3, lead 164, to lead 128. This will move the piston rod 98 of cylinder 160 up thereby raising plunger 74 and substrate 35 to the position of FIG. 10 preparatory to swaging the contact pins.

With the plunger 74 up, cam 175 will cause microswitch 148 to transfer its contact opening the holding circuit for relay R8. Therelease of this relay will prevent operation of the Down valve 146 through T contact R8–3 now open thus insuring that the plunger 101 will be maintained up. Also air cylinder 150 will again be operated by the reclosing of normally closed contact R8–2 which will again operate the Up valve 143 over the circuit traced above. This will bring plunger 101 down on the substrate forcing it downward bulging or swaging the shanks to form bulges below the substrate. At the end of the stroke the cam 161 will again actuate microswitch 147 which will again transfer its contacts operating the relay R5. This will in turn close contact R5–1 to again complete the operating circuit for Down valve 145 through T contacts R7–2 and R4–2, microswitch 147 transferred and contact R5–1 raising ram 101. Another circuit is closed through T contacts R5–3 and microswitch 148 transferred to actuate the Down valve 146 to lower the piston rod 74 of cylinder 160.

With the plunger 74 still up and microswitch 148 transferred, the relay R6 is operated over lead 167, contact R5–3, lead 176, switch 148, lead 178, contact R8–3, lead 180, through winding of relay R6. A circuit is now closed from lead 129, lead 167, contact R5–3, lead 176, transferred switch 148, lead 181, Down valve 146 to lead 128. The operation of relay R–6 meanwhile has opened the locking circuit for relay R2 at T contact R6–2. The locking circuits for relays R3 and R4 are opened at contact R2–2. Contact R4–4 opening releases relay R7 and contact R7–2 releases relay R6 which through R6–4 releases relay R5 restoring the circuit to normal.

The table is now returned to station A where operation of button 107 will, as described above, actuate relay R2, the contact R2–5 of which will close a circuit for operating solenoid 177 the plunger of which will force ram 74 upward raising the substrate for removal.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. In a machine for fastening pins in a wafer,
   a table for supporting a die for holding a wafer with pins inserted therein,
   pressure means mounted above said table and adapted when actuated to form heads on said pins,
   means for actuating said pressure means toward said table,
   a second pressure means in said table carrying said die,
   a second means for actuating said second pressure means to elevate said wafer and pins above said table, and electrical means for sequentially operating said first actuating means to cause said first pressure means to form a head on each pin, operating said second actuating means to elevate said wafer and pins and reactuating said first pressure means to swage a bulge in each pin below the wafer.

2. In a machine for fastening pins in a wafer, a table supporting a die for holding a wafer with pins inserted therein, first pressure means mounted above said table adapted when actuated to form heads on said pins, first means for actuating said first pressure means toward said table, second pressure means in said table carrying said die, second means for actuating said second pressure means to raise said wafer and pins above said table, and electrical means for sequentially actuating said first actuating means to cause said first pressure means to form a head on each pin, actuating said second actuating means to raise and hold said wafer and pins and reactuating said first actuating means to cause said first pressure means to swage a bulge in each pin below the wafer.

3. In a machine for fastening pins in a wafer, a table supporting a die for holding a wafer with pins inserted therein, a ram mounted above said table adapted when actuated to form heads on said pins, an air cylinder for actuating said ram toward said table, a second ram in said table carrying rods in said die, a second air cylinder for actuating said second ram, and electrical means for sequentially actuating said first air cylinder to cause said first ram to form a head on each pin, actuating said second cylinder to raise said rods to elevate said wafer and pins and reactuating said first cylinder to cause said first ram to swage a bulge in each pin below the wafer while held by said second ram.

4. In a machine for inserting pins in a wafer of insulating material, a table mounted for movement past a plurality of stations, a die in said table having holes therein corresponding to holes around the edge of said wafer, a ram reciprocably mounted in the base of said table adjacent said die, a plurality of rods secured in said ram and extending into the lower portion of the holes in said table, a resilient pad mounted on said table between said holes therein, a clamp for holding said wafer on said pad with the holes therein in alignment with the holes in said die, an electromagnet located adjacent the first of said stations for actuating said clamp, a plurality of tubes equal in number and pattern to the holes in said wafer for feeding pins to said die, a shuttle member mounted for reciprocation between said tubes and said die, an electromagnet at the second of said stations for reciprocating said shuttle to feed pins through said wafer and into said die and into contact with said rods, a manually operated ram at the third of said stations for seating said pins against said rods, a second ram reciprocably mounted at the fourth of said stations, an air cylinder mounted at said fourth station adapted to actuate said second ram to form heads and swage bulges on said pins, a second air cylinder mounted at said fourth station adapted to actuate said first ram to raise said rods to hold said wafer and pins during said swaging operation, electromechanical means for controlling the operation of said air cylinders and circuit means controlled by the positioning of said table at said stations to sequentially actuate said electromagnets and air cylinders whereby pins are inserted in said wafers and heads and bulges formed thereon.

5. In a machine for inserting pins in holes in a wafer of insulating material, a table mounted for movement past a plurality of stations, a die in said table having holes therein corresponding to holes around the edge of said wafer, pressure means mounted in the base of said table, means for holding said wafer on said table with the holes therein in alignment with the holes in said die, an electromagnet located adjacent the first of said stations for releasing said holding means, a plurality of tubes equal in number and pattern to the holes in said wafer for feeding pins to said die, an electromagnet at the second of said stations for controlling the feed of said pins from said tubes through said wafer and into said die until held by said pressure means, a manually operated ram at the third of said stations for seating said pins against said pressure means, a second pressure means mounted at the fourth of said stations, actuating means mounted at said fourth station adapted to operate said second pressure means to form heads and swage bulges on said pins, a second actuating means mounted at said fourth station adapted to operate said first pressure means to raise and hold said pins during said swaging operation, electromechanical means for controlling the operation of said actuating means, and circuit means controlled by the positioning of said table at said stations to sequentially actuate said electromagnets and actuating means whereby pins are inserted in said wafers and heads and bulges formed thereon.

References Cited by the Examiner
UNITED STATES PATENTS

| | | | |
|---|---|---|---|
| 1,456,079 | 5/23 | Stuebner | 78—49.9 |
| 1,682,911 | 9/28 | Jorgensen | 78—49 |
| 2,328,821 | 9/28 | Lyon | 78—49 |
| 3,110,201 | 11/63 | Fusik | 78—49 |

CHARLES W. LANHAM, *Primary Examiner.*

WILLIAM J. STEPHENSON, *Examiner.*